United States Patent
Shi

(10) Patent No.: US 12,271,750 B2
(45) Date of Patent: Apr. 8, 2025

(54) METHODS AND APPARATUSES FOR PROCESSING VIRTUAL MACHINE MIGRATION IN RESPONSE TO RESOURCE REQUIREMENT FROM VNF, DEVICE AND STORAGE MEDIUM

(71) Applicant: ZTE Corporation, Shenzhen (CN)

(72) Inventor: Jie Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 512 days.

(21) Appl. No.: 17/606,078

(22) PCT Filed: Jul. 22, 2020

(86) PCT No.: PCT/CN2020/103552
§ 371 (c)(1),
(2) Date: Oct. 25, 2021

(87) PCT Pub. No.: WO2021/013185
PCT Pub. Date: Jan. 28, 2021

(65) Prior Publication Data
US 2022/0206836 A1 Jun. 30, 2022

(30) Foreign Application Priority Data
Jul. 22, 2019 (CN) .......................... 201910663286.4

(51) Int. Cl.
*G06F 9/50* (2006.01)
*G06F 9/455* (2018.01)
*G06F 9/48* (2006.01)

(52) U.S. Cl.
CPC ........ *G06F 9/45558* (2013.01); *G06F 9/4856* (2013.01); *G06F 9/5061* (2013.01);
(Continued)

(58) Field of Classification Search
None
See application file for complete search history.

(56) References Cited

U.S. PATENT DOCUMENTS 8,903,992 B2 * 12/2014 Huang ................ G06F 11/3419
709/224
9,098,214 B1 * 8/2015 Vincent ..................... G06F 8/10
(Continued)

FOREIGN PATENT DOCUMENTS

CN 102236582 A * 11/2011
CN 103309723 A 9/2013
(Continued)

OTHER PUBLICATIONS

Chen et al. (Year: 2011).*
(Continued)

*Primary Examiner* — Abu Zar Ghaffari
(74) *Attorney, Agent, or Firm* — CANTOR COLBURN LLP

(57) ABSTRACT

According to a method for processing virtual machine migration, in a case where idle resources on each single one of multiple physical hosts in a system do not meet a resource requirement from a virtualized network function (VNF) but total idle resources on the multiple physical hosts meet the resource requirement from the VNF, a virtual machine migration strategy is determined according to resource information about resources currently occupied on each of the multiple physical hosts and corresponding service information, and live migration may be performed on virtual machines.

12 Claims, 5 Drawing Sheets

```
S401: Determine virtual machines supporting live migration on each physical
host according to a list of virtual machines supporting the live
migration acquired from a VNF S402: Remove, from the virtual machines supporting the live migration, a
virtual machine meeting the following condition: a sum of resources
occupied by the virtual machine and the idle resources of the physical
host where the virtual machine is located does not meet the resource
requirement from the VNF S403: Select, from remaining virtual machines, at least one virtual machine as
the target virtual machine to out-migratethe target virtual machine to
be migrated out
```

(52) U.S. Cl.
CPC .......... *G06F 9/5077* (2013.01); *G06F 9/5083* (2013.01); *G06F 9/5088* (2013.01); *G06F 9/45533* (2013.01); *G06F 2009/4557* (2013.01); *G06F 2009/45595* (2013.01); *G06F 9/5005* (2013.01)

(56) References Cited

U.S. PATENT DOCUMENTS

| | | | |
|---|---|---|---|
| 9,438,466 B1* | 9/2016 | O'Gorman | H04L 69/329 |
| 9,672,054 B1* | 6/2017 | Gupta | G06F 3/0647 |
| 9,882,828 B1 | 1/2018 | Sandlerman | |
| 10,725,885 B1* | 7/2020 | Paraschiv | G06F 11/3433 |
| 2010/0115332 A1* | 5/2010 | Zheng | G06F 11/1461 |
| | | | 714/E11.091 |
| 2013/0247037 A1* | 9/2013 | Lee | G06F 9/455 |
| | | | 718/1 |
| 2013/0304899 A1* | 11/2013 | Winkler | G06F 9/5088 |
| | | | 718/1 |
| 2014/0074997 A1* | 3/2014 | Zhu | G06F 9/4856 |
| | | | 709/222 |
| 2015/0295790 A1 | 10/2015 | Cropper | |
| 2016/0328258 A1* | 11/2016 | Iwashina | G06F 9/5077 |
| 2017/0017512 A1* | 1/2017 | Csatari | G06F 9/45558 |
| 2017/0220371 A1* | 8/2017 | Kosugi | H04W 88/14 |
| 2017/0250870 A1* | 8/2017 | Zhao | H04L 63/20 |
| 2017/0371717 A1* | 12/2017 | Kiess | G06F 9/5077 |
| 2018/0032362 A1* | 2/2018 | Buil | H04L 67/10 |
| 2018/0191838 A1* | 7/2018 | Friedman | H04L 41/0895 |
| 2018/0239648 A1* | 8/2018 | Formanek | G06F 9/5077 |
| 2018/0246757 A1* | 8/2018 | Li | G06F 8/65 |
| 2018/0373553 A1* | 12/2018 | Connor | G06F 9/45558 |
| 2019/0205220 A1* | 7/2019 | Zhang | G06F 11/1469 |
| 2020/0174845 A1* | 6/2020 | Toeroe | G06F 8/65 |
| 2020/0326989 A1* | 10/2020 | Li | H04L 67/1031 |
| 2021/0149699 A1* | 5/2021 | Celozzi | G06F 11/076 |
| 2021/0216350 A1* | 7/2021 | Ito | G06F 9/45558 |

FOREIGN PATENT DOCUMENTS

| | | |
|---|---|---|
| CN | 106506201 A | 3/2017 |
| CN | 108337109 A | 7/2018 |

OTHER PUBLICATIONS

F. Z. Yousaf, C. Goncalves, L. Moreira-Matias and X. C. Perez, "RAVA—Resource aware VNF agnostic NFV orchestration method for virtualized networks," 2016 IEEE 27th Annual PIMRC, Valencia, Spain, 2016, pp. 1-6, doi: 10.1109 (Year: 2016).*

European Search Report for corresponding application EP20 844 290.5; Report dated Aug. 17, 2022.

International Search Report for corresponding application PCT/CN2020/103552 filed Jul. 22, 2020; Mail date Oct. 23, 2020.

* cited by examiner

Fig. 1

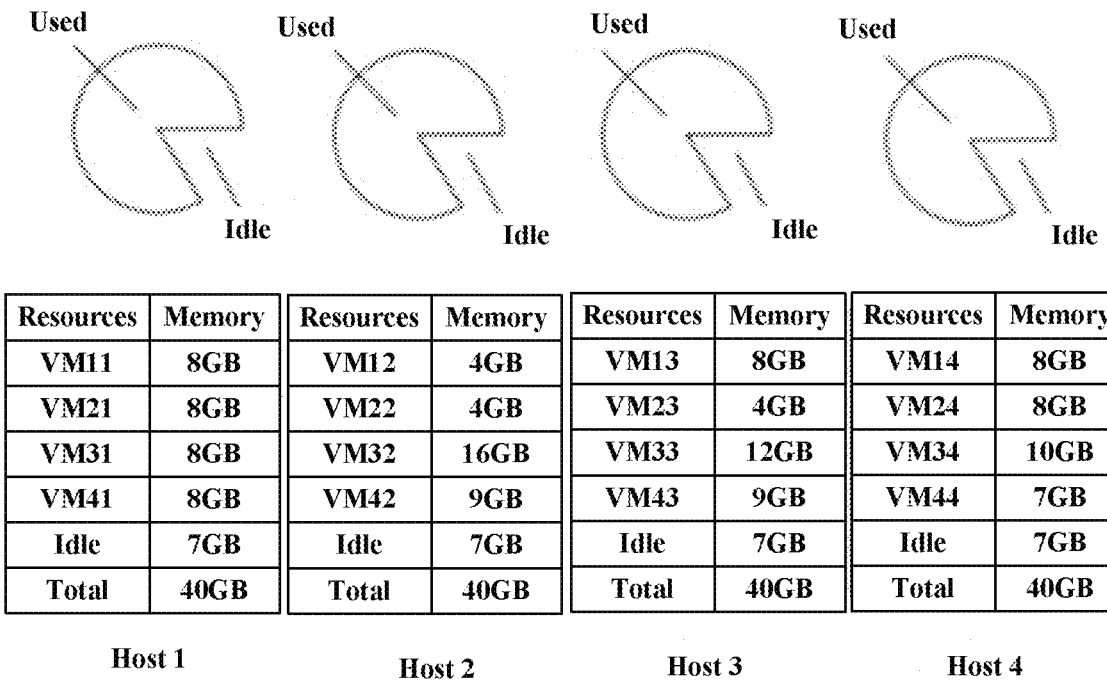

--PRIOR ART--

Fig. 2

Acquire, in a case where idle resources on each single one of multiple physical hosts in a system do not meet a resource requirement from a VNF but total idle resources on the multiple physical hosts meet the resource requirement from the VNF, resource information about resources currently occupied on each of the multiple physical hosts by a virtual resource layer and service information corresponding to the resource information — S201

Determine a virtual machine migration strategy according to the resource requirement from the VNF, information about the idle resources on each of the multiple physical hosts, the resource information about the resources currently occupied on each of the multiple physical hosts and the service information corresponding to the resource information — S202

METHODS AND APPARATUSES FOR PROCESSING VIRTUAL MACHINE MIGRATION IN RESPONSE TO RESOURCE REQUIREMENT FROM VNF, DEVICE AND STORAGE MEDIUM

CROSS REFERENCE

This application is a National Stage Filing of the PCT International Application No. PCT/CN2020/103552 filed on Jul. 22, 2020, which claims priority to Chinese Application No. 201910663286.4 filed on Jul. 22, 2019, the entirety of which is herein incorporated by reference.

TECHNICAL FIELD

Embodiments of the present disclosure relate to the field of communication, in particular to a method and an apparatus for processing virtual machine migration, a method and an apparatus for generating a virtual machine migration strategy, a device and a storage medium.

BACKGROUND

With protocol specifications of virtualized network functions (VNF) of European Telecommunications Standards Institute (ETSI) and virtualization technologies gradually mature, increasing operators build their network functions on virtualization platforms. Cost is saved by replacing special network element equipment of equipment manufacturers with industrial standard general-purpose servers, storage devices and switching devices. The operators obtain more flexible network orchestration and deployment capacities with the aid of open application programming interface (API) based on cloud management platforms (such as open source OpenStack®, RedHat® and VMware®). Universal hardware resources and open platform interfaces make fulfillment and maintenance of services more flexible, which leads to scenarios such as automatic fulfillment and deployment of the services, auto scale out and self-healing under abnormal conditions. For live migration action, the protocol specifications put forward higher requirements for management systems. Different from cold migration affecting the services, the live migration requires that the services be lossless in the process of virtual machine migrations.

It is inevitable that even the cloud management platform based on general hardware is constrained by hardware to some extents, such as by a resource capacity of the server itself. Creating a virtual machine by scheduling resources through the open API requires resources needed by the virtual machine, such as a central processing unit (CPU) and a memory, to be physically located on some physical host. Only when idle resources on the physical host are sufficient to satisfy a resource requirement from the virtual machine, can the virtual machine be created normally, otherwise, the virtual machine cannot be created. It is a common situation during actual operation or running that all physical hosts in an environment have adequate resources together, but not individually. For example, with reference to the scenario shown in FIG. 1, suppose that a virtual machine with 8 GB memory needs to be created, there are four physical hosts on the cloud platform, and each one has only 7 GB idle memory, with idle resources 28 GB in total. In such a case, despite sufficient total idle resources of the platform, the virtual machine cannot be successfully created on any one of the physical hosts and can be created only when a new physical host with adequate memory is added, resulting in high cost and low resource utilization.

SUMMARY

Embodiments of the present disclosure provides a method and an apparatus for processing virtual machine migration, a method and an apparatus for generating a virtual machine migration strategy, a device and a storage medium, which solve the problems that in the related art, high cost and low resource utilization rates are caused due to the fact that a virtual machine cannot be created in a case where idle resources on each single one of multiple physical hosts do not meet a resource requirement from a virtualized network function (VNF) but total idle resources on the multiple physical hosts meet the resource requirement from the VNF.

Some embodiments of the present disclosure provide the method for generating the virtual machine migration strategy. The method includes:
  acquiring, in a case where idle resources on each single one of multiple physical hosts in a system do not meet a resource requirement from a VNF but total idle resources on the multiple physical hosts meet the resource requirement from the VNF, resource information about resources currently occupied on each of the multiple physical hosts by a virtual resource layer and service information corresponding to the resource information; and
  determining a virtual machine migration strategy according to the resource requirement from the VNF, information about the idle resources on each of the multiple physical hosts, the resource information about the resources currently occupied on each of the multiple physical hosts and the service information corresponding to the resource information, wherein the virtual machine migration strategy includes at least one target out-migration physical host, at least one target virtual machine to be migrated out of the target out-migration physical host, and at least one target in-migration physical host into which the target virtual machine is to be migrated, and a sum of the idle resources on the target out-migration physical host and resources occupied by the target virtual machine to be migrated out meets the resource requirement from the VNF.

Some embodiments of the present disclosure provide the method for processing virtual machine migration. The method includes:
  receiving a request including a resource requirement from a VNF;
  generating a virtual machine migration strategy through the method for generating the virtual machine migration strategy described above in a case where idle resources on each single one of multiple physical hosts in a system do not meet the resource requirement from the VNF but total idle resources on the multiple physical hosts meet the resource requirement from the VNF;
  generating a response message including the virtual machine migration strategy, and sending the response message to a requester sending the request; and
  performing, in a case where a virtual machine migration instruction is received, virtual machine migration according to the virtual machine migration strategy indicated by the virtual machine migration instruction.

Some embodiments of the present disclosure provide the apparatus for generating the virtual machine migration strategy. The apparatus includes:

an information acquisition module, configured to acquire, in a case where idle resources on each single one of multiple physical hosts in a system do not meet a resource requirement from VNF but total idle resources on the multiple physical hosts meet the resource requirement from the VNF, resource information about resources currently occupied on each of the multiple physical hosts by a virtual resource layer and service information corresponding to the resource information; and a strategy generation module, configured to determine a virtual machine migration strategy according to the resource requirement from the VNF, information about the idle resources on each of the multiple physical hosts, the resource information about the resources currently occupied on each of the multiple physical hosts and the service information corresponding to the resource information, wherein the virtual machine migration strategy includes at least one target out-migration physical host, at least one target virtual machine to be migrated out of the target out-migration physical host, and at least one target in-migration physical host into which the target virtual machine is to be migrated, and a sum of the idle resources on the target out-migration physical host and resources occupied by the target virtual machine to be migrated out meets the resource requirement from the VNF.

Some embodiments of the present disclosure provide an apparatus for processing virtual machine migration. The apparatus includes the apparatus for generating the virtual machine migration strategy described above, and may further include a request processing module and an execution module.

The request processing module is configured to receive a request including a resource requirement from a VNF, generate a response message according to the virtual machine migration strategy generated by the apparatus for generating the virtual machine migration strategy and send the response message to a requester sending the request.

The apparatus for generating the virtual machine migration strategy is configured to generate the virtual machine migration strategy and send the virtual machine migration strategy to the request processing module in a case where idle resources on each single one of multiple physical hosts in a system do not meet a resource requirement from the VNF but total idle resources on the multiple physical hosts meet the resource requirement from the VNF.

The execution module is configured to perform, in a case where a virtual machine migration instruction is received, virtual machine migration according to the virtual machine migration strategy indicated by the virtual machine migration instruction.

Some embodiments of the present disclosure provide a communication device, including a processor, a memory and a communication bus.

The communication bus is configured to connect the processor and the memory.

The processor is configured to execute a first computer program stored in the memory, so as to implement operations of the method for generating the virtual machine migration strategy described above; or the processor is configured to execute a second computer program stored in the memory, so as to implement operations of the method for processing virtual machine migration described above.

Some embodiments of the present disclosure provide a computer-readable storage medium storing a first computer program, wherein the first computer program is capable of being executed by one or more processors to cause the one or more processors to perform operations of the method for generating the virtual machine migration strategy described above; or the computer-readable storage medium storing a second computer program, and wherein the second computer program is capable of being executed by one or more processors to cause the one or more processors to perform operations of the method for processing virtual machine migration described above.

Other features and corresponding beneficial effects of the embodiments of the present disclosure are elaborated and described in the later portion of the specification, and it should be understood that at least a portion of the beneficial effects becomes obvious from records in the specification of the present disclosure.

BRIEF DESCRIPTION OF THE DRAWINGS

FIG. 1 is a schematic diagram of exemplary resource occupation of four physical hosts on a cloud platform;

FIG. 2 is a schematic flowchart of an exemplary method for generating a virtual machine migration strategy in some embodiments of the present disclosure;

DETAILED DESCRIPTION

Figure 3:
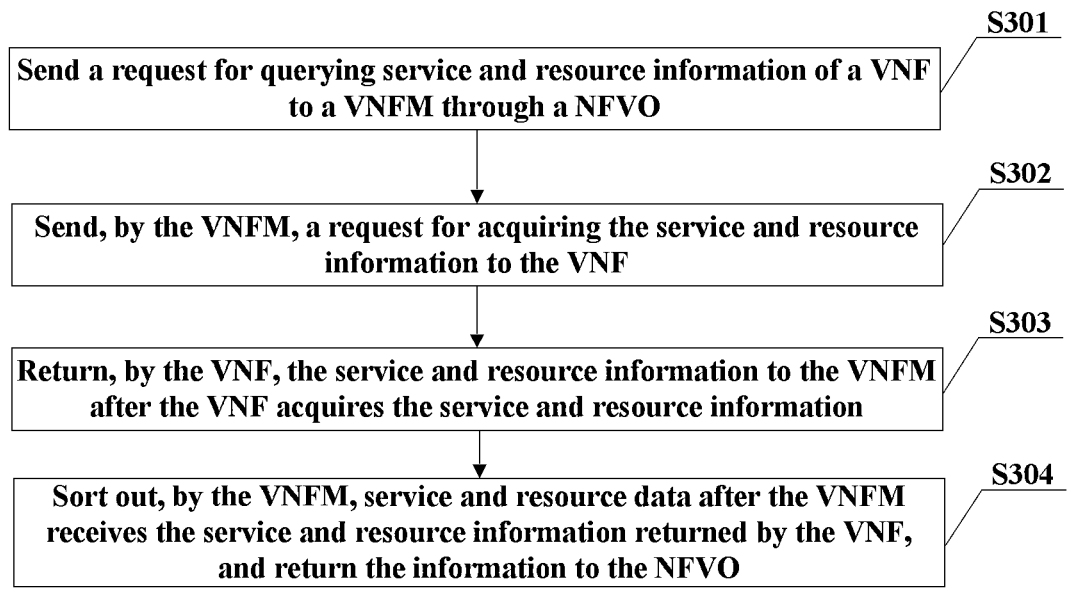
FIG. 3 is a schematic diagram of an exemplary process of acquiring information about partial services in some embodiments of the present disclosure.

To make the objectives, technical solutions and advantages of embodiments of the present disclosure clearer, the following further describes the embodiments of the present disclosure in detail with reference to exemplary embodiments and in conjunction with the accompanying drawings. It should be understood that the exemplary embodiments described herein are merely used to explain the embodiments of the present disclosure, and are not used to limit the embodiments of the present disclosure.

According to a method for processing virtual machine migration and a method for generating a virtual machine migration strategy provided in the embodiments, in a case where idle resources on each single one of multiple physical hosts in a system do not meet a resource requirement from a VNF but total idle resources on the multiple physical hosts meet the resource requirement from the VNF, a virtual machine migration strategy may be determined according to resource information about resources currently occupied on each of the multiple physical hosts by a virtual resource layer and service information corresponding to the resource information, such that virtual machines on the physical hosts can be reasonably migrated to reasonably integrate the resources on the physical hosts, so as to meet the resource requirement from the VNF, improve a resource utilization rate and reduce cost.

For the convenience of understanding, the embodiment will be described below with the method for generating the virtual machine migration strategy as an example. As shown in FIG. 2, the method includes operations S201 and S202.

At S201, in a case where idle resources on each single one of multiple physical hosts in a system do not meet the resource requirement from the VNF but total idle resources on the multiple physical hosts meet the resource requirement from the VNF, resource information about resources currently occupied on each of the multiple physical hosts by a virtual resource layer and service information corresponding to the resource information are acquired.

The resource requirement from the VNF in the embodiments may be resource requirements from the VNF in various scenarios, for example, including but not limited to at least one of a sandbox test scenario, a VNF instantiation deployment scenario and a VNF auto scale out operation scenario.

In some application scenarios of the embodiments, the idle resources on the physical host refer to resources except for currently occupied resources and pre-allocated resources on the physical host.

In some application scenarios of the embodiments, the operation that the resource information about resources currently occupied on each of the multiple physical hosts by the virtual resource layer is acquired includes, but is not limited to: the resource information about the resources currently occupied on each of the multiple physical hosts is acquired from a virtual infrastructure manager (VIM) layer. The resource information includes, but is not limited to, deployed virtual machines on each of the multiple physical hosts and information about resources occupied by the deployed virtual machines, for example, the number of cores, central processing unit (CPU) resources, memory resources and disk resources. According to some exemplary implementations, in some application scenarios, the resource information acquired according to requirements may further include, but is not limited to, at least one of a mutual exclusive relation between virtual machines and an affinity relation between virtual machines. For example, information may be sent to a VIM through a network functions virtualization orchestrator (NFVO) to acquire resource information about resources currently occupied on each of the multiple physical hosts by a virtual resource layer.

In some application scenarios of the embodiments, the operation that the service information corresponding to the resource information is acquired includes, but is not limited to: a list of virtual machines supporting live migration is acquired from the VNF. According to some exemplary implementations, in some application scenarios, the service information acquired according to requirements may further include, but is not limited to at least one of priorities of VNFs, a corresponding relation between the virtual machines and VNFs, and indicators of virtual machine importance degrees. For example, the priorities of the VNFs and the corresponding relation between the virtual machines and the VNFs may be directly acquired from the NFVO. For example, information including but not limited to the indicators of virtual machine importance degrees, and the list of virtual machines supporting live migration may be acquired from the VNF through a message flow. As shown in FIG. 3, an exemplary acquisition process includes operations S301 to S304.

At S301, a request for querying service and resource information of the VNF is sent to a virtualized network function manager (VNFM) through the NFVO.

At S302, the VNFM sends a request for acquiring the service and resource information to the VNF.

At S303, the VNF sends the service and resource information to the VNFM after the VNF acquires the service and resource information.

At S304, the VNFM sorts out service and resource data after the VNFM receives the service and resource information returned by the VNF, and returns the information to the NFVO, specifically to a corresponding module executing generation of the virtual machine migration strategy in the NFVO.

At S202, a virtual machine migration strategy is determined according to the resource requirement from the VNF, the information about the idle resources on each of the multiple physical hosts, the resource information about the resources currently occupied on each of the multiple physical hosts and the service information corresponding to the resource information.

In the embodiments, the virtual machine migration strategy includes at least one target out-migration physical host (could be one target out-migration physical host or multiple target out-migration physical hosts), at least one target virtual machine (could be one target virtual machine or multiple target virtual machines) to be migrated out of the target out-migration physical host, and at least one target in-migration physical host (could be one target in-migration physical host or multiple target in-migration physical hosts) into which the target virtual machine is to be migrated. A sum of the idle resources on the target out-migration physical host and resources occupied by the target virtual machine to be migrated out meets the resource requirement from the VNF.

Figure 4:
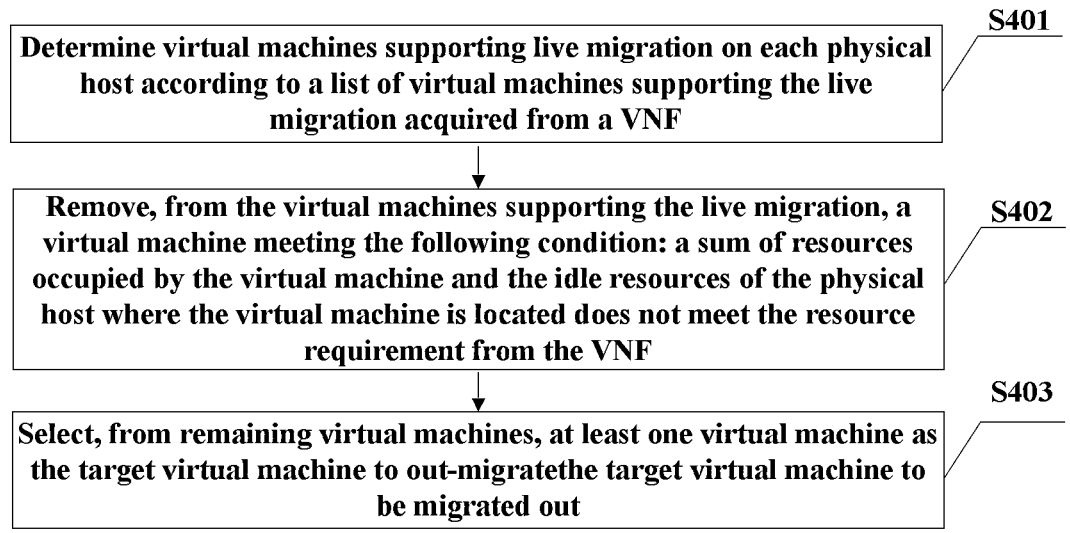
FIG. 4 is a schematic diagram of an exemplary process of determining a virtual machine migration strategy in some embodiments of the present disclosure.

In some exemplary implementations of the embodiments, in order to improve satisfaction of service experience, the virtual machine migration in the embodiments may use the virtual machine live migration, so as to achieve lossless services during the virtual machine migration. For example, the operation that the virtual machine migration strategy is determined according to the resource requirement from the VNF, the information about the idle resources on each of the multiple physical hosts, the resource information about the resources currently occupied on each of the multiple physical hosts and the service information corresponding to the resource information is shown in FIG. 4, and includes the following operations S401 to S403.

At S401, virtual machines supporting the live migration on each of the multiple physical hosts are determined according to the list of virtual machines supporting the live migration acquired from the VNF.

At S402, from the virtual machines supporting the live migration acquired in S401, a virtual machine meeting the following condition is removed: a sum of resources occupied by the virtual machine and the idle resources of the physical host where the virtual machine is located does not meet the resource requirement from the VNF.

At S403, from the remaining virtual machines acquired in S402, at least one virtual machine is selected as the target virtual machine to be migrated out, at least one physical host where the selected target virtual machine is located is determined as the target out-migration physical host, and at least one physical host whose idle resources meet a resource requirement from the target virtual machine to be migrated out is selected, from the multiple physical hosts, as the target in-migration physical host.

In some exemplary implementations of the embodiments, selecting, from the remaining virtual machines, at least one virtual machine as the target virtual machine to be migrated out may be implemented in any one of the following manners:

- a principle of minimum migration times: correspondingly, the operation that at least one virtual machine is selected from the remaining virtual machines as the target virtual machine to be migrated out includes that at least one virtual machine is selected from the remaining virtual machines as the target virtual machine to be migrated out according to the principle of minimum migration times;
- a principle of the minimum number of VNFs under influence: correspondingly, the service information acquired may further include a corresponding relation between the virtual machines and VNFs; and the operation that at least one virtual machine is selected from the remaining virtual machines as the target virtual machine to be migrated out includes: at least one virtual machine is selected from the remaining virtual machines as the target virtual machine to be migrated out according to the corresponding relation between the virtual machines and the VNFs and a principle that a minimum number of VNFs are involved in migration; and
- a service influence irrelevance principle: the service information acquired may further include at least one of the priorities of the VNFs and the indicators of virtual machine importance degrees of the virtual machines; and the operation that at least one virtual machine is selected from the remaining virtual machines as the target virtual machine to be migrated out may include: at least one virtual machine with a lowest virtual machine importance degree is selected from the remaining virtual machines as the target virtual machine to be migrated out according to at least one of the priorities of the VNFs and the indicators of the virtual machine importance degrees of the virtual machine.

According to some exemplary implementations, in order to improve accuracy and effect of virtual machine migration and avoid deploying virtual machines having a mutual exclusive relation to a physical host after migration, in some application scenarios of the embodiments, the resource information acquired from the VIM may further include a mutual exclusive relation between the virtual machines. In these application scenarios, before at least one of the remaining virtual machines is selected as the target virtual machine to be migrated out in S403, the method may further include the following operation.

According to the acquired mutual exclusive relation between virtual machines, virtual machines with the mutual exclusive relation are removed from the remaining virtual machines. In this way, the situation that virtual machines having a mutual exclusive relation are deployed to the same physical host after migration is avoided, and the accuracy of control over the virtual machine migration is improved.

According to some exemplary implementations, in order to improve the accuracy and the effect of the virtual machine migration and avoid deploying virtual machines with an affinity relation to different physical hosts after migration, in some application scenarios of the embodiments, the resource information acquired from the VIM may further include the affinity relation between the virtual machines. In these application scenarios, in S403 above, the operation that at least one virtual machine is selected from the remaining virtual machines as the target virtual machine to be migrated out includes the following operation.

In a case where a virtual machine is selected from the remaining virtual machines as the target virtual machine to be migrated out and it is determined according to the affinity relation between the virtual machines that a virtual machine which has an affinity relation with the selected virtual machine exists, the virtual machine having the affinity relation with the selected virtual machine is determined as a target virtual machine to be migrated out as well. In this way, the virtual machines having the affinity relation are migrated to the same physical host during out-migration, which can guarantee that after migration, virtual machines with an affinity relation may still remain on the same physical host.

Figure 5:
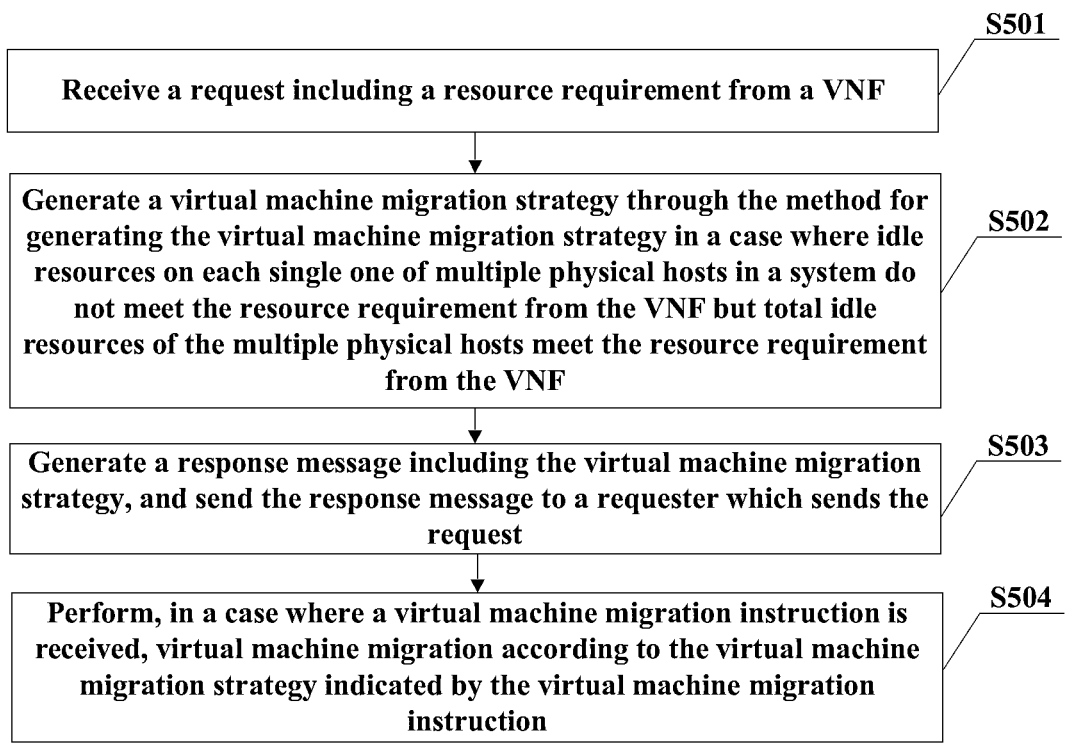
FIG. 5 is a schematic flowchart of an exemplary method for processing virtual machine migration in some embodiments of the present disclosure.

The embodiments also provide a method for processing virtual machine migration. As shown in FIG. 5, the method includes operations S501 to S504.

At S501, a request including a resource requirement from a VNF is received.

In this operation, an NFVO may receive the request including the resource requirement from the VNF. It is appreciated that the request in the embodiments may include, but is not limited to, at least one of the following requests:

- a sandbox test request including the resource requirement from the VNF;
- an authorization request including the resource requirement for instantiation deployment from the VNF; and
- an authorization request including the resource requirement for auto scale out operation deployment from the VNF.

At S502, a virtual machine migration strategy is generated through the method for generating the virtual machine migration strategy described above in a case where idle resources on each single one of multiple physical hosts in a system do not meet the resource requirement from the VNF, but total idle resources on the multiple physical hosts meet the resource requirement from the VNF.

At S503, a response message including the virtual machine migration strategy is generated, and the response message is sent to a requester sending the request.

At S504, in a case where a virtual machine migration instruction is received, virtual machine migration is performed according to the virtual machine migration strategy indicated by the virtual machine migration instruction.

According to the method for processing the virtual machine migration and the method for generating the virtual machine migration strategy, on one hand, the resource information of the virtual resource layer may be acquired from the VIM layer, and on the other hand, the service information corresponding to the resource information may be acquired from the NFVO and through message interaction between the NFVO and the VNFM, and between the VNFM and the VNF. An optimal solution for resource migration and deployment is determined based on virtual resource statistics and service analysis according to a corresponding strategy. In some exemplary implementations, the live migration of the virtual machine may be executed through the NFVO, the virtual machines are partially migrated in a service lossless manner, and resources of physical host nodes corresponding to the virtual machines are released, so that idle resources on the physical hosts can meet a requirement for deploying resources as needed. In some exemplary implementations, the process can also support automatic integration into a life cycle management process to complete all actions. In this way, on one hand, a utilization rate of the resources is improved, and on the other hand, a success rate of a resource operation in a life cycle operation can be improved as well.

Figure 6:
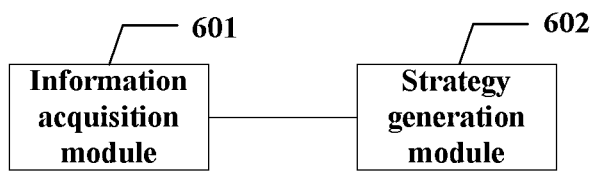
FIG. 6 is a structural schematic diagram of an exemplary apparatus for generating a virtual machine migration strategy in some embodiments of the present disclosure.

The embodiments also provide an apparatus for generating a virtual machine migration strategy, and the apparatus for generating the virtual machine migration strategy may be arranged in various communication devices or systems for generating a virtual machine migration strategy, for example, in a network functions virtualization orchestrator (NFVO). As shown in FIG. 6, the apparatus for generating the virtual machine migration strategy includes an information acquisition module 601 and a strategy generation module 602.

The information acquisition module 601 is configured to acquire, in a case where idle resources on each single one of multiple physical hosts in a system do not meet a resource requirement from a VNF but total idle resources on the multiple physical hosts meet the resource requirement from the VNF, resource information about resources currently occupied on each of the multiple physical hosts by a virtual resource layer and service information corresponding to the resource information. Herein, the above embodiments may be referred to for the method for acquiring information and specific contents of the acquired information, which are not be repeated herein.

The strategy generation module 602 is configured to determine a virtual machine migration strategy according to the resource requirement from the VNF, information about the idle resources on each of the multiple physical hosts, the resource information about the resources currently occupied on each of the multiple physical hosts and the service information corresponding to the resource information. The virtual machine migration strategy includes at least one target out-migration physical host, at least one target virtual machine to be migrated out of the target out-migration physical host, and at least one target in-migration physical host into which the target virtual machine is to be migrated. A sum of the idle resources on the target out-migration physical host and resources occupied by the target virtual machine to be migrated out meets the resource requirement from the VNF. A specific process of generating the virtual machine migration strategy has been described in the above embodiments, and is not described in detail herein.

Figure 7:
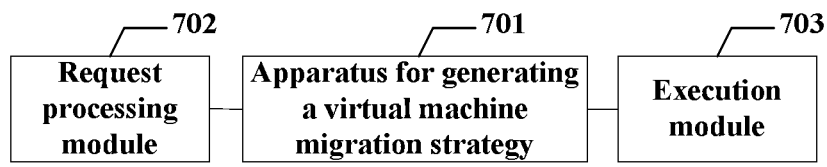
FIG. 7 is a structural schematic diagram of another exemplary apparatus for generating a virtual machine migration strategy in some embodiments of the present disclosure.

The embodiments also provide an apparatus for processing virtual machine migration, and the apparatus for processing virtual machine migration may be arranged in various communication devices or systems, for example, in a network functions virtualization orchestrator (NFVO). As shown in FIG. 7, the apparatus for generating the virtual machine migration strategy includes the apparatus 701 for generating the virtual machine migration strategy, and further includes a request processing module 702 and an execution module 703.

The request processing module 702 is configured to receive a request including a resource requirement from a VNF, generate a response message according to the virtual machine migration strategy generated by the apparatus for generating the virtual machine migration strategy, and send the response message to a requester who sent the request.

The request may include, but is not limited to, at least one of the following requests: a sandbox test request including the resource requirement from the VNF, an authorization request including the resource requirement for instantiation deployment from the VNF; and an authorization request including the resource requirement for auto scale out operation deployment from the VNF.

The apparatus 701 for generating the virtual machine migration strategy is configured to generate, through the method described in the above embodiments, the virtual machine migration strategy and send the virtual machine migration strategy to the request processing module in a case where idle resources on each single one of multiple physical hosts in a system do not meet a resource requirement from the VNF but total idle resources on the multiple physical hosts meet the resource requirement from the VNF.

The execution module 703 is configured to perform, in a case where a virtual machine migration instruction is received, virtual machine migration according to the virtual machine migration strategy indicated by the virtual machine migration instruction.

For the convenience of understanding, the embodiments will be described below with several specific application scenarios as examples.

Application Scenario 1: A Sandbox Test Process of VNF Resource Deployment

Figure 8:
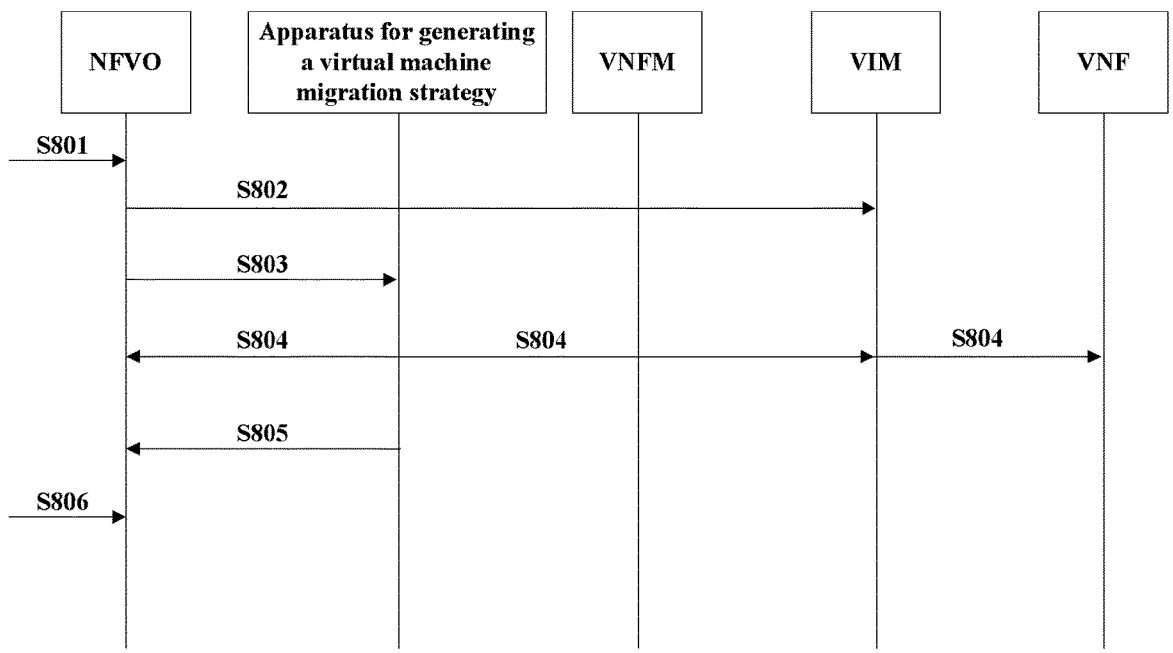
FIG. 8 is a schematic flowchart of an exemplary sandbox test application scenario in some embodiments of the present disclosure.

As shown in FIG. 8 which is a schematic diagram of a sandbox test process of VNF resource deployment in the embodiments, the process includes the following processing operations S801 to S806.

At S801, before resource deployment, a sandbox test is triggered from a client, and whether a resource can meet a deployment requirement is verified.

At S802, after a sandbox test request is received, the NFVO sends a resource query request to a VIM, and a resource requirement required by the VNF is checked according to resource information acquired from the VIM. In a case where there are sufficient resources and existing idle resources can meet the requirement from the VNF, an authorization result is directly returned. In a case where total idle resources are sufficient, but idle resources of each single node (that is, a single physical host) are insufficient, proceed to S803; otherwise, a sandbox test failure is directly returned.

At S803, a resource operation solution request is sent to the apparatus for generating the virtual machine migration strategy.

At S804, after the apparatus for generating the virtual machine migration strategy receives the resource operation solution request, the apparatus starts to acquire resource information and corresponding service information and generate the virtual machine migration strategy. Detailed description is provided as follows.

Resource layer information: relevant resource information is acquired from the VIM, and includes, but is not limited to the following information: information about the idle resources on each of the multiple physical hosts (the number of cores/memories/disks), information of existing virtual machines on the physical hosts (name/resource, etc.), an affinity relation and a mutual exclusive relation between virtual machines, etc. Application layer information: the apparatus for generating the virtual machine migration strategy acquires detailed information about the virtual machine and the VNF from the NFVO, wherein the information that can be directly acquired from the NFVO may include, but is not limited to: priorities of VNFs, a corresponding relation between the virtual machines and VNFs, etc. Partial information that cannot be acquired directly includes service and resource information of the VNF which cannot be acquired directly from the NFVO, but the NFVO may send a request for querying the service and resource information of the VNF to the VNFM, the VNFM may acquire, from the VNF by sending a service resource information acquisition request, information including, but not limited to: a list of virtual machines supporting live migration in the VNF, indicators of virtual machine importance degrees, etc. After collection of information is completed, the virtual machine migration strategy may be generated by but not limited to the method described in the above embodiments.

At S805, a sandbox test verification failure response is returned to the NFVO, and the virtual machine migration strategy (that is, an optimal resource migration solution) is carried in the response and sent to a user.

At S806, according to a resource migration deployment solution, the user implements corresponding virtual machine live migration through a NFVO client, such that new resource deployment can be performed after the involved node resources are released.

Application Scenario 2: A VNF Instantiation Process.

Figure 9:
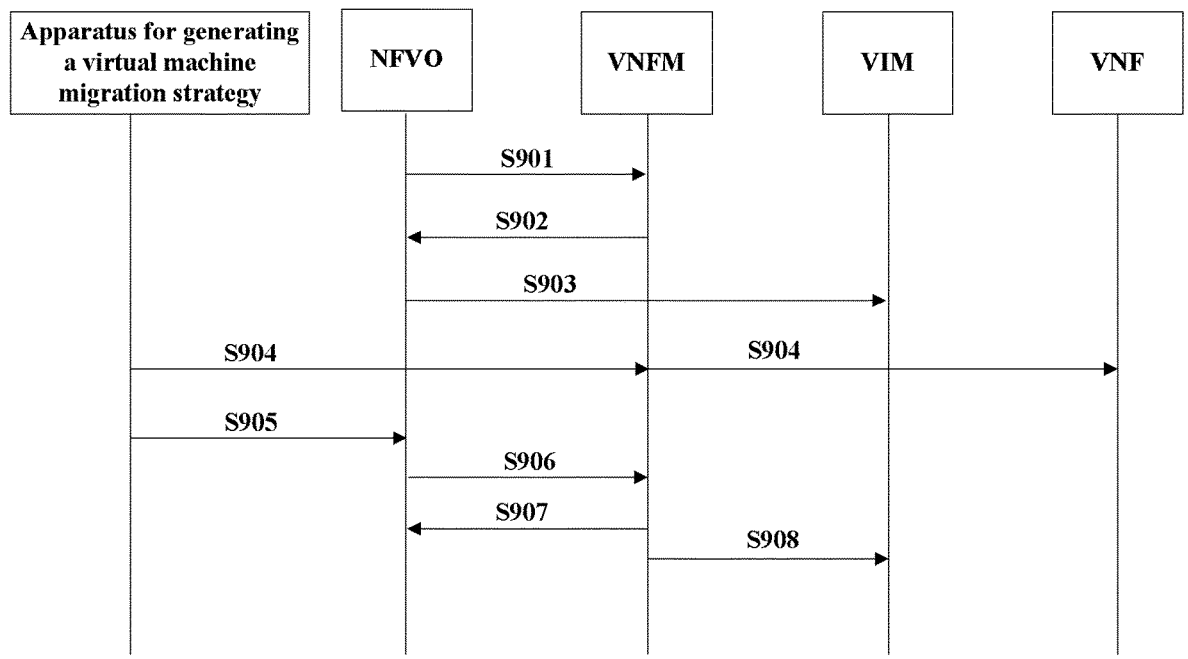
FIG. 9 is a schematic flowchart of an exemplary VNF instantiation application scenario in some embodiments of the present disclosure.

FIG. 9 is a schematic diagram of the VNF instantiation process in some embodiments of the present disclosure, and the process includes the following processing operations S901 to S908.

At S901, during instantiation, a network functions virtualization orchestrator (NFVO) sends an instantiation request to a virtualized network function manager (VNFM).

At S902, the VNFM calculates a resource requirement currently needing to be deployed, and sends an authorization request of the resource requirement to the NFVO through an authorization interface.

At S903, after the NFVO receives the authorization request, the NFVO sends a resource query request to a VIM, and a resource requirement required by the VNF is authorized according to resource information acquired from the VIM. In a case where there are sufficient resources and existing idle resources of a single physical host can meet the requirement from the VNF, an authorization result is directly returned. In a case where the total idle resources are sufficient, but resources of each single physical host are insufficient, proceed to the following process, otherwise, an authorization failure is directly returned.

At S904, after an apparatus for generating a virtual machine migration strategy receives a resource operation solution request, the apparatus starts to acquire resource information and corresponding service information and generate the virtual machine migration strategy. Detailed description is provided as follows.

Resource layer information: relevant resource information is acquired from the VIM, and includes, but is not limited to the following information: information about the idle resources on each of the multiple physical hosts (the number of cores/memories/disks), information of existing virtual machines on the physical hosts (name/resource, etc.), an affinity relation and a mutual exclusive relation between virtual machines, etc. Application layer information: the apparatus for generating the virtual machine migration strategy acquires detailed information about the virtual machine and the VNF from the NFVO, wherein the information that can be directly acquired from the NFVO may include, but is not limited to: priorities of VNFs, a corresponding relation between the virtual machines and VNFs, etc. Partial information that cannot be acquired directly includes service and resource information of the VNF which cannot be acquired directly from the NFVO, but the NFVO may send a request for querying the service and resource information of the VNF to the VNFM, the VNFM may acquire, from the VNF by sending a service resource information acquisition request, information including, but not limited to: a list of virtual machines supporting live migration in the VNF, indicators of virtual machine importance degrees, etc. After collection of information is completed, the virtual machine migration strategy may be generated by but not limited to the method described in the above embodiments.

At S905, a response is returned to the NFVO, and the virtual machine migration strategy (that is, an optimal resource migration solution) is carried in the response and sent to a user.

At S906, after the NFVO receives the response carrying the virtual machine migration strategy, an authorization response is assembled and returned to the VNFM.

At S907, according to the authorization response received and a migration solution in the authorization response, the VNFM notifies the NFVO to implement virtual machine live migration. At S908, after the live migration is completed, a VNF resource is created.

The follow-up process of instantiation continues and is not described herein.

Application Scenario 3: A VNF Auto Scale Out Process.

Figure 10:
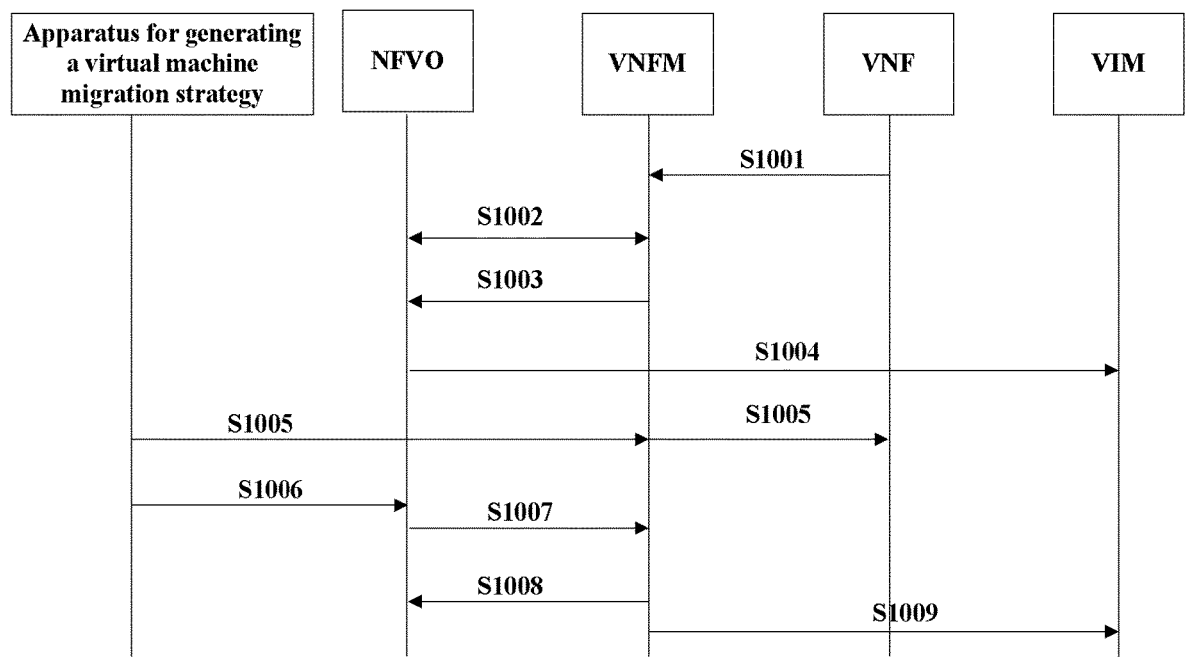
FIG. 10 is a schematic flowchart of an exemplary VNF auto scale out application scenario in some embodiments of the present disclosure.

As shown in FIG. 10 which is a scenario in an auto scale out capacity expansion process of a VNF in some embodiments of the present disclosure, in the process of scaling out of a virtual machine, if there is no host node whose resources can meet a requirement during authorization, the process includes the following processing operations S1001 to S1009.

At S1001, after detecting that service performance data reach an auto scale out threshold, the VNF triggers an auto scale out operation, and the VNF sends a request for auto scale out of a virtual machine to a virtualized network function manager (VNFM).

At S1002, the VNFM sends a notice of the VNF auto scale out operation to a network functions virtualization orchestrator (NFVO), and the NFVO returns a notice receiving response.

At S1003, the VNFM acquires, according to a type of the auto scale out of the virtual machine, a resource requirement corresponding to this type from a VNFD model, and sends the resource requirement to the NFVO through an authorization request.

At S1004, after the NFVO receives the authorization request, resource information is acquired from the VIM, and whether idle resources of a certain physical host node can meet the resource requirement is determined through comparison. If there is a physical host node whose resources can meet the resource requirement, an authorization pass is directly returned, otherwise, proceed to the following operations.

At S1005, after the apparatus for generating the virtual machine migration strategy receives a resource operation solution request, the apparatus starts to acquire resource information and corresponding service information and generate the virtual machine migration strategy. Detailed description is provided as follows.

Resource layer information: relevant resource information is acquired from the VIM, and includes, but is not limited to the following information: information about the idle resources on each of the multiple physical hosts (the number of cores/memories/disks), information of existing virtual machines on the physical hosts (name/resource, etc.), an affinity relation and a mutual exclusive relation between virtual machines, etc. Application layer information: the apparatus for generating the virtual machine migration strategy acquires detailed information about the virtual machine and the VNF from the NFVO, wherein the information that can be directly acquired from the NFVO may include, but is not limited to: priorities of VNFs, a corresponding relation between the virtual machines and VNFs, etc. Partial information that cannot be acquired directly includes service and resource information of the VNF which cannot be acquired directly from the NFVO, but the NFVO may send a request for querying the service and resource information of the VNF to the VNFM, the VNFM may acquire, from the VNF by sending a service resource information acquisition request, information including, but not limited to: a list of virtual machines supporting live migration in the VNF, indicators of virtual machine importance degrees, etc. After collection of information is completed, the virtual machine migration strategy may be generated by but not limited to the method described in the above embodiments.

At S1006, a response is returned to the NFVO, and the virtual machine migration strategy (that is, an optimal resource migration solution) is carried in the response and sent to a user.

At S1007, after the NFVO receives a response message carrying the virtual machine migration strategy, an authorization response is assembled and returned to the VNFM.

At S1008, according to the authorization response received and a migration solution in the authorization response, the VNFM notifies the NFVO to implement virtual machine live migration.

At S1009, after the live migration is completed, auto scale out virtual machine resources are created.

The follow-up process of auto scale out continues and is not described herein.

It should be understood that the apparatus for generating the virtual machine migration strategy and the apparatus for processing virtual machine migration provided in the embodiments are not limited to the application scenarios of the above examples.

Figure 11:
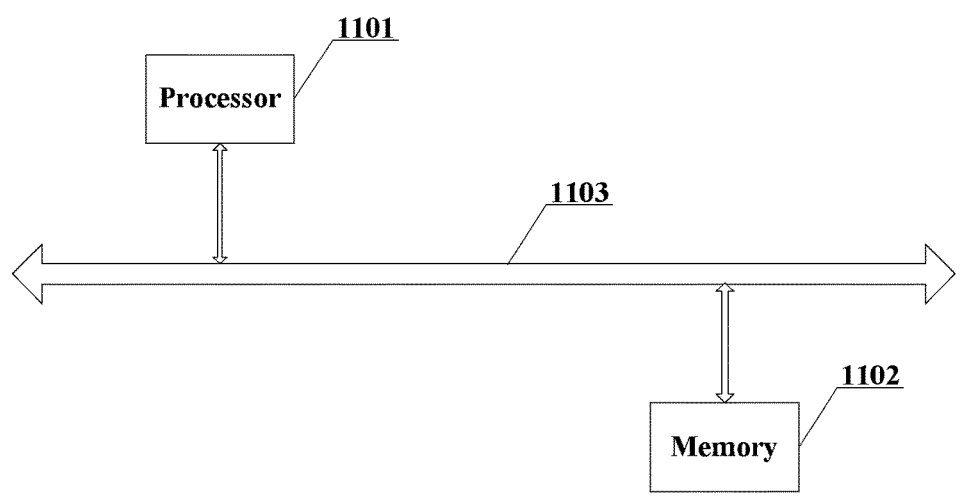
FIG. 11 is a schematic structural diagram of an exemplary communication device in some embodiments of the present disclosure.

The embodiments also provide a communication device, and the communication device may be, but is not limited to, an NFVO network element, as shown in FIG. 11, and includes a processor 1101, a memory 1102 and a communication bus 1103.

The communication bus 1103 is configured to realize communication connection between the processor 1101 and the memory 1102.

In some exemplary implementations, the processor 1101 may be configured to execute a first computer program stored in the memory 1102, so as to implement operations of the method for generating the virtual machine migration strategy in the above embodiments.

In some other exemplary implementations, the processor 1101 may be configured to execute a second computer program stored in the memory 1102, so as to implement operations of the method for processing virtual machine migration in the above embodiments.

The method and the apparatus for processing virtual machine migration, the method and the apparatus for generating the virtual machine migration strategy provided by the embodiments of the present disclosure will achieve the following beneficial effects. In a case where idle resources on each single one of multiple physical hosts in a system do not meet a resource requirement from a VNF but total idle resources on the multiple physical hosts meet the resource requirement from the VNF, a virtual machine migration strategy is determined according to resource information about resources currently occupied on each of the multiple physical hosts by a virtual resource layer and service information corresponding to the resource information, and in the determined virtual machine migration strategy, a sum of the idle resources on the target out-migration physical host and resources occupied by the target virtual machine to be migrated out meets the resource requirement from the VNF. When necessary, according to the virtual machine migration strategy, the virtual machine may be migrated, such that idle resources on the target out-migration physical host after migration meet the resource requirement (for example a resource requirement for creating a virtual machine) from the VNF, without the need of additionally arranging a physical host to meet the resource requirement from the VNF. It can be concluded that according to the embodiments of the present disclosure, the resources on the physical hosts are reasonably integrated through reasonable migration of the virtual machine, which can improve the resource utilization rate and reduce the cost.

In some exemplary implementations of the embodiments of the present disclosure, a network functions virtualization orchestrator (NFVO) is utilized to perform live migration of the virtual machines, the virtual machines are partially migrated in a service lossless manner, resources of physical host nodes corresponding to the virtual machines are released, so that idle resources on the physical hosts can meet a requirement for deploying resources as needed. In some exemplary implementations, the process can also support automatic integration into a life cycle management process to complete all actions. In this way, on one hand, a utilization rate of the resources is improved, and on the other hand, a success rate of a resource operation in a life cycle operation may be improved as well.

The embodiments also provide the computer-readable storage medium including volatile or nonvolatile, removable or non-removable media implemented in any method or technology for storing information (such as computer-readable instructions, data structures, computer program modules or other data). The computer-readable storage medium includes, but is not limited to, a random access memory (RAM), a read-only memory (ROM), an electrically erasable programmable read only memory (EEPROM), a flash memory or other memory technologies, a compact disc read-only memory (CD-ROM), a digital versatile disc (DVD) or other optical memories, cassettes, magnetic tapes, disk memories or other magnetic storage devices, or any other medium that may be used to store desired information and may be accessed by computers.

In some exemplary implementations, the computer-readable storage medium in the embodiments may be used to store a first computer program, and the first computer program may be executed by one or more processors to cause the one or more processors to perform operations of the method for generating the virtual machine migration strategy in the above embodiments.

In some other exemplary implementations, the computer-readable storage medium in the embodiments may be configured to store a second computer program, and the second computer program may be executed by one or more processors to cause the one or more processors to perform operations of the method for processing virtual machine migration in the above embodiments.

The embodiments also provide a first computer program (or computer software), the computer program may be distributed on the computer-readable medium and executed by a computable device, so as to implement at least one operation of the method for generating the virtual machine migration strategy described in the above embodiments. In some cases, at least one operation shown or described may be executed in an order different from that described in the above embodiments.

The embodiments also provide a second computer program (or computer software), the computer program may be distributed on the computer-readable medium and executed by a computable device, so as to implement at least one operation of the method for processing virtual machine migration described in the above embodiments. In some cases, at least one operation shown or described may be executed in an order different from that described in the above embodiments.

The embodiments also provide a computer program product, including a computer-readable device, and the computer program shown above is stored on the computer-readable device. In the embodiments, the computer-readable device may include the computer-readable storage medium shown above.

Therefore, it should be understood by those having ordinary skill in the art that all or some of the operations in the methods disclosed above and all or some of the functional modules/units in the devices and systems disclosed above may be implemented as software (which may be implemented by executable computer program codes of a computing device), firmware, hardware and an appropriate combination thereof. In an implementation of the hardware, division between the functional modules/units mentioned in the above description does not necessarily correspond to division of physical components. For example, a physical component may have a plurality of functions, or a function or an operation may be cooperatively executed by several physical components. Some or all of physical components may be implemented as software executed by the processor, such as a central processing unit, a digital signal processor or a microprocessor, or as hardware, or as an integrated circuit, such as an application-specific integrated circuit.

Further, it is well known to a person having ordinary skill in the art that the communication medium typically includes the computer-readable instructions, the data structures, the computer program modules or other data in, for example, a carrier wave or a modulated data signal of other transmission mechanisms, and may include any information delivery medium. Therefore, the embodiments of the present disclosure are not limited to any specific hardware and software combination.

The above content is a further detailed description of the present disclosure in conjunction with exemplary embodiments, and it should not be considered that the exemplary embodiments of the present disclosure are merely limited to these descriptions. For those having ordinary skill in the art to which the embodiments of the present disclosure belong, they may make several simple deductions and substitutions on the premise without deviating from a concept of the embodiments of the present disclosure, which shall be considered to fall within a protection scope of the embodiments of the present disclosure.

INDUSTRIAL APPLICABILITY

In a case where idle resources on each single one of multiple physical hosts in a system do not meet a resource requirement from a VNF but total idle resources on the multiple physical hosts meet the resource requirement from the VNF, a virtual machine migration strategy is determined according to resource information about resources currently occupied on each of the multiple physical hosts by a virtual resource layer and service information corresponding to the resource information, and in the determined virtual machine migration strategy, a sum of the idle resources on the target out-migration physical host and resources occupied by the target virtual machine to be migrated out meets the resource requirement from the VNF. When necessary, according to the virtual machine migration strategy, the virtual machine may be migrated, such that idle resources on the target out-migration physical host after migration meet the resource requirement (for example a resource requirement for creating a virtual machine) from the VNF, without the need of additionally arranging a physical host to meet the resource requirement from the VNF. It can be concluded that according to the embodiments of the present disclosure, the resources on the physical hosts are reasonably integrated through reasonable migration of the virtual machine, which can improve the resource utilization rate and reduce the cost.

What is claimed is:

1. A method for processing virtual machine migration, comprising:

acquiring, in a case where idle resources on each single one of multiple physical hosts in a system do not meet a resource requirement from a virtualized network function (VNF) but total idle resources on the multiple physical hosts meet the resource requirement from the VNF, resource information about resources currently occupied on each of the multiple physical hosts by a virtual resource layer and service information corresponding to the resource information, wherein the resource information comprises deployed virtual machines on each of the multiple physical hosts and information about resources occupied by the deployed virtual machines, and the service information corresponding to the resource information comprises: a list of virtual machines that are able to be live migrated;

determining a virtual machine migration strategy according to the resource requirement from the VNF, information about the idle resources on each of the multiple physical hosts, the resource information about the resources currently occupied on each of the multiple physical hosts and the service information corresponding to the resource information, wherein the virtual machine migration strategy comprises at least one target out-migration physical host in the multiple physical hosts, at least one target virtual machine to be migrated out of the target out-migration physical host, and at least one target in-migration physical host, into which the target virtual machine is to be migrated, in the multiple physical hosts, and a sum of the idle resources on the target out-migration physical host and the resources occupied by the target virtual machine to be migrated out meets the resource requirement from the VNF; and determining the virtual machine migration strategy comprises: determining virtual machines that are able to be live migrated on each of the multiple physical hosts according to the list of virtual machines that are able to be live migrated acquired from the VNF; removing, from the virtual machines that are able to be live migrated, a virtual machine meeting the following condition: a sum of resources occupied by the virtual machine and the idle resources of the physical host where the virtual machine is located does not meet the resource requirement from the VNF; and selecting, from remaining virtual machines, at least one virtual machine as the target virtual machine to be migrated out, determining at least one physical host where the selected target virtual machine is located as the target out-migration physical host, and selecting, from the multiple physical hosts, at least one physical host whose idle resources meet a resource requirement from the target virtual machine to be migrated out as the target in-migration physical host;

generating a response message comprising the virtual machine migration strategy, and sending the response message to a requester sending a request; and performing, in a case where a virtual machine migration instruction is received from the requester, virtual machine migration according to the virtual machine migration strategy indicated by the virtual machine migration instruction.

2. The method for processing virtual machine migration according to claim 1, wherein acquiring the resource information about the resources currently occupied on each of the multiple physical hosts by the virtual resource layer comprises: acquiring the resource information about the resources currently occupied on each of the multiple physical hosts from a virtual infrastructure manager (VIM) layer; and acquiring the service information corresponding to the resource information comprises: acquiring, from the VNF, the list of virtual machines that are able to be live migrated.

3. The method for processing virtual machine migration according to claim 1, wherein selecting, from the remaining virtual machines, at least one virtual machine as the target virtual machine to be migrated out comprises: selecting, from the remaining virtual machines, at least one virtual machine as the target virtual machine to be migrated out according to a principle of minimum migration times.

4. The method for processing virtual machine migration according to claim 1, wherein the service information further comprises a corresponding relation between the virtual machines and virtualized network functions (VNFs); and selecting, from the remaining virtual machines, at least one virtual machine as the target virtual machine to be migrated out comprises: selecting, from the remaining virtual machines, at least one virtual machine as the target virtual machine to be migrated out according to the corresponding relation between the virtual machines and the VNFs and a principle that a minimum number of VNFs are involved in migration.

5. The method for processing virtual machine migration according to claim 1, wherein the service information further comprises at least one of priorities of virtualized network functions (VNFs) and indicators of virtual machine importance degrees of the virtual machines; and selecting, from the remaining virtual machines, at least one virtual machine as the target virtual machine to be migrated out comprises:

selecting, from the remaining virtual machines, at least one virtual machine with a lowest virtual machine importance degree as the target virtual machine to be migrated out according to at least one of the priorities of the VNFs and the indicators of the virtual machine importance degrees of the virtual machine.

6. The method for processing virtual machine migration according to claim 1, wherein the resource information further comprises a mutual exclusive relation between the virtual machines; and before selecting, from the remaining virtual machines, at least one virtual machine as the target virtual machine to be migrated out, the method further comprises:

removing virtual machines having a mutual exclusive relation from the remaining virtual machines according to the mutual exclusive relation between the virtual machines.

7. The method for processing virtual machine migration according to claim 1, wherein the resource information further comprises an affinity relation between the virtual machines; and selecting, from the remaining virtual machines, at least one virtual machine as the target virtual machine to be migrated out comprises:

determining, in a case where a virtual machine is selected from the remaining virtual machines as the target virtual machine to be migrated out and it is determined according to the affinity relation between the virtual machines that a virtual machine which has an affinity relation with the selected virtual machine exists, the virtual machine having the affinity relation with the selected virtual machine as a target virtual machine to be migrated out, and migrating the virtual machines having the affinity relation to the same physical host during out-migration.

8. The method for processing virtual machine migration according to claim 1, before acquiring the resource information about the resources currently occupied on each of the multiple physical hosts by the virtual resource layer and the service information corresponding to the resource information, the method further comprising:

receiving from the requester the request comprising the resource requirement from the VNF.

9. The method for processing virtual machine migration according to claim 8, wherein the request comprises at least one of the following requests:

a sandbox test request comprising the resource requirement from the VNF;

an authorization request comprising the resource requirement for instantiation deployment from the VNF; and an authorization request comprising the resource requirement for auto scale out operation deployment from the VNF.

10. A non-transitory computer-readable storage medium storing a first computer program, wherein the first computer program is capable of being executed by one or more processors to cause the one or more processors to perform operations of the method for generating the virtual machine migration strategy according to claim 1.

11. An apparatus for processing virtual machine migration, comprising a memory storing instructions and a processor in communication with the memory, wherein the processor is configured to execute the instructions to:

acquire, in a case where idle resources on each single one of multiple physical hosts in a system do not meet a resource requirement from a virtualized network function (VNF) but total idle resources on the multiple physical hosts meet the resource requirement from the VNF, resource information about resources currently occupied on each of the multiple physical hosts by a virtual resource layer and service information corresponding to the resource information, wherein the resource information comprises deployed virtual machines on each of the multiple physical hosts and information about resources occupied by the deployed virtual machines, and the service information corresponding to the resource information comprises: a list of virtual machines that are able to be live migrated;

determine a virtual machine migration strategy according to the resource requirement from the VNF, information about the idle resources on each of the multiple physical hosts, the resource information about the resources currently occupied on each of the multiple physical hosts and the service information corresponding to the resource information, wherein the virtual machine migration strategy comprises at least one target out-migration physical host in the multiple physical hosts, at least one target virtual machine to be migrated out of the target out-migration physical host, and at least one target in-migration physical host, into which the target virtual machine is to be migrated, in the multiple physical hosts, and a sum of the idle resources on the target out-migration physical host and the resources occupied by the target virtual machine to be migrated out meets the resource requirement from the VNF; and the processor is configured to execute the instructions to determine the virtual machine migration strategy by performing operations comprising: determining virtual machines that are able to be live migrated on each of the multiple physical hosts according to the list of virtual machines that are able to be live migrated acquired from the VNF; removing, from the virtual machines that are able to be live migrated, a virtual machine meeting the following condition: a sum of resources occupied by the virtual machine and the idle resources of the physical host where the virtual machine is located does not meet the resource requirement from the VNF; and selecting, from remaining virtual machines, at least one virtual machine as the target virtual machine to be migrated out, determining at least one physical host where the selected target virtual machine is located as the target out-migration physical host, and selecting, from the multiple physical hosts, at least one physical host whose idle resources meet a resource requirement from the target virtual machine to be migrated out as the target in-migration physical host;

generate a response message comprising the virtual machine migration strategy, and send the response message to a requester sending a request; and perform, in a case where a virtual machine migration instruction is received from the requester, virtual machine migration according to the virtual machine migration strategy indicated by the virtual machine migration instruction.

12. The apparatus for processing virtual machine migration according to claim 11, wherein the processor is further configured to execute the instructions to:

receive from the requester the request comprising the resource requirement from the VNF.

* * * * *